(12) United States Patent
Tanabe et al.

(10) Patent No.: US 10,274,321 B2
(45) Date of Patent: Apr. 30, 2019

(54) MOBILE DEVICE

(71) Applicant: KYOCERA Corporation, Kyoto-shi, Kyoto (JP)

(72) Inventors: Shigeki Tanabe, Yokohama (JP); Hideki Morita, Yokohama (JP); Isao Masuike, Machida (JP); Shinya Saito, Kawasaki (JP)

(73) Assignee: KYOCERA CORPORATION, Kyoto (JP)

( * ) Notice: Subject to any disclaimer, the term of this patent is extended or adjusted under 35 U.S.C. 154(b) by 74 days.

(21) Appl. No.: 15/488,704

(22) Filed: Apr. 17, 2017

(65) Prior Publication Data
US 2017/0299392 A1  Oct. 19, 2017

(30) Foreign Application Priority Data
Apr. 18, 2016  (JP) .................. 2016-083172

(51) Int. Cl.
*G06F 19/00* (2018.01)
*G01C 21/08* (2006.01)
*G01C 23/00* (2006.01)

(52) U.S. Cl.
CPC ............. *G01C 21/08* (2013.01); *G01C 23/00* (2013.01)

(58) Field of Classification Search
CPC ..... H04B 10/116; H04B 10/11; H04N 5/2353
USPC ..................... 702/2, 4–6, 182–185
See application file for complete search history.

(56) References Cited

U.S. PATENT DOCUMENTS 8,862,427 B2    10/2014   Sakuraoka
2011/0081634 A1*  4/2011   Kurata .................. G01C 21/20
                                                        434/236

FOREIGN PATENT DOCUMENTS

JP          2011-257374 A       12/2011

* cited by examiner

*Primary Examiner* — Edward Raymond
(74) *Attorney, Agent, or Firm* — Hauptman Ham, LLP

(57) ABSTRACT

There is provided a mobile device comprising a geomagnetic sensor configured to detect a geomagnetic value, and at least one controller configured to perform a notification for a user using a predetermined device when it determines that a pattern of a change of the geomagnetic value matches with a predetermined geomagnetic pattern.

12 Claims, 6 Drawing Sheets

MOBILE DEVICE

CROSS-REFERENCE TO RELATED APPLICATION

The present application claims priority to and incorporates by reference the entire contents of Japanese Patent Application No. 2016-083172 filed in Japan on Apr. 18, 2016.

FIELD

The present application relates to a mobile device.

BACKGROUND

Typically, in a mobile device such as a mobile phone or a wearable device, various sensors are installed with the aim of detecting a situation in which the mobile device is placed (see Japan Patent Application Laid-open No. 2011-257374).

In such a mobile device, there is room for improvement in the technology for detecting the situation in which the mobile device is placed.

SUMMARY

A mobile device is disclosed.

According to one aspect, there is provided a mobile device comprising: a geomagnetic sensor configured to detect a geomagnetic value; and at least one controller configured to perform a notification for a user using a predetermined device when it determines that a pattern of a change of the geomagnetic value matches with a predetermined geomagnetic pattern.

According to one aspect, there is provided a mobile device comprising: a geomagnetic sensor configured to detect a geomagnetic value; an angular velocity sensor configured to detect an angular velocity value; an acceleration sensor configured to detect an acceleration value; and at least one controller configured to perform a notification for a user using a predetermined device when it determines that at least two of timing of a change in the geomagnetic value, timing of a change in the angular velocity value, and timing of a change in the acceleration value synchronize with each other.

The above and other objects, features, advantages and technical and industrial significance of this disclosure will be better understood by reading the following detailed description of presently preferred embodiments of the disclosure, when considered in connection with the accompanying drawings.

DETAILED DESCRIPTION OF THE PREFERRED EMBODIMENTS

Figure 1:
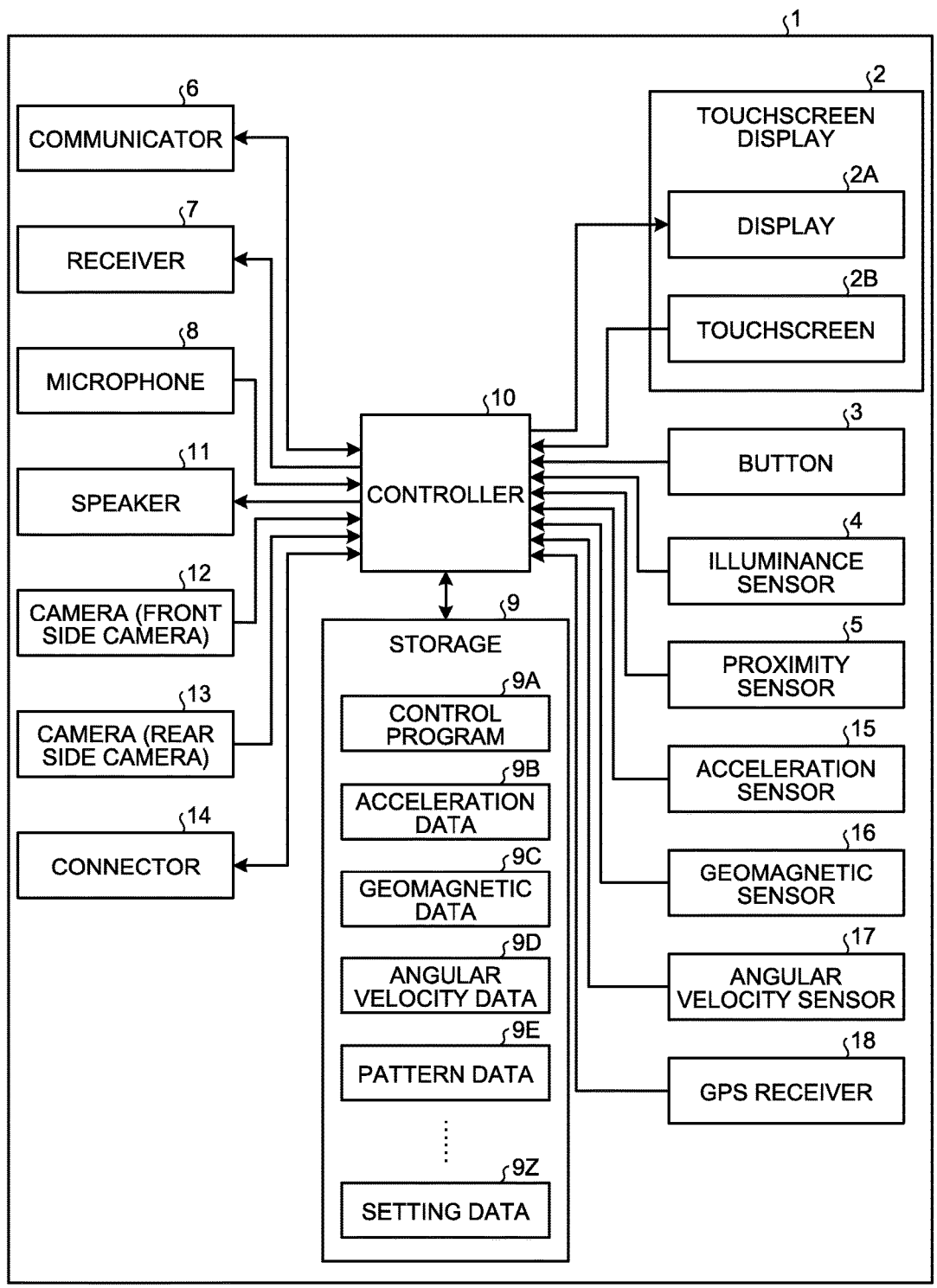
FIG. 1 is a block diagram illustrating a wearable device.

Embodiments of a mobile device according to the present application are described below in detail with reference to the accompanying drawings. The following explanation is given for a wearable device representing an example of a mobile device. In the following explanation, identical constituent elements are referred to by the same reference numerals. Moreover, redundant explanation is not repeated.

Explained below with reference to FIG. 1 is an exemplary functional configuration of a wearable device 1 according the embodiments. FIG. 1 is a block diagram illustrating the wearable device 1. It is possible to attach the wearable device 1 to clothing of a user. Herein, attaching the wearable device 1 to the clothing of the user implies, for example, putting the wearable device 1 in a pocket of the clothing or attaching the wearable device 1 to the clothing using an attaching member.

As illustrated in FIG. 1, the wearable device 1 includes a touchscreen display 2, one or more buttons 3, an illuminance sensor 4, a proximity sensor 5, a communicator 6, a receiver 7, a microphone 8, a storage 9, a controller 10, a speaker 11, a camera 12, a camera 13, a connector 14, an acceleration sensor 15, a geomagnetic sensor 16, an angular velocity sensor 17, and a GPS receiver 18 (GPS stands for Global Positioning System). In the following explanation, the wearable device 1 is sometimes referred to as "the device".

The touchscreen display 2 includes a display 2A and a touchscreen 2B. Herein, for example, the display 2A and the touchscreen 2B can be positioned in an overlapping manner, or can be positioned alongside each other, or can be positioned at a distance from each other. If the display 2A and the touchscreen 2B are positioned in an overlapping manner, for example, one or more sides of the display 2A need not be parallel to any side of the touchscreen 2B.

The display 2A includes a display device such as a liquid crystal display (LCD), an organic electro-luminescence display (OELD), or an inorganic electro-luminescence display (IELD). The display 2A is capable of displaying objects such as characters, images, symbols, and diagrams in a screen.

The touchscreen 2B is capable of detecting contact or proximity thereto of one or more fingers, one or more pens, or one or more stylus pens. When the contact or the proximity of one or more fingers, one or more pens, or one or more stylus pens thereto is detected; the touchscreen 2B is capable of detecting a position of the contact or the proximity thereon. The fingers, or the pens, or the stylus pens detected by the touchscreen 2B is sometimes written as "the finger". In some embodiments, the electrostatic capacitance method, the resistive method, or the load sensing method can be appropriately implemented as the detection method.

Based on the detection result obtained by the touchscreen 2B, the controller 10 is capable of determining the type of gesture. The detection result can include, for example, the number of contacts, the position at which the contact is detected, a change of the position at which the contact is detected, the temporal length for which the contact is detected, the temporal interval at which the contacts are detected, and the number of times for which the contact is detected. The operations implementable by the controller 10 can be performed by the wearable device 1 that includes the controller 10. In other words, the operations of the controller 10 may be performed by the wearable device 1. Meanwhile, the gesture represents the operation performed with respect to the touchscreen 2B using the finger. The operation performed with respect to the touchscreen 2B can be performed also with respect to the touchscreen display 2 that includes the touchscreen 2B. Examples of the gesture distinguished by the controller 10 via the touchscreen 2B include, but are not limited to, a touch, a long touch, a release, a swipe, a tap, a double tap, a long tap, a drag, a flick, pinching in, and pinching out. However, the gesture is not limited to those examples.

The button 3 receives an operation input from the user. Upon receiving the operation input from the user, the button 3 notifies the controller 10 of the reception of the operation input. Meanwhile, there may be a single button 3 or more than one buttons 3.

The illuminance sensor 4 is capable of detecting illuminance. Herein, the illuminance represents a value of the luminous flux falling on a unit area of a measurement surface of the illuminance sensor 4. Moreover, for example, the illuminance sensor 4 can also be used for adjusting luminance of the display 2A.

The proximity sensor 5 is capable of performing contact-less detection of presence of a nearby object. Herein, the proximity sensor 5 can detect the presence of an object based on a change in the magnetic field or based on a change in feedback time of reflected waves of ultrasonic waves. Moreover, for example, the proximity sensor 5 may also be used in detecting approach of a face of the user to the display 2A. Meanwhile, the illuminance sensor 4 and the proximity sensor 5 may be configured as a single sensor. Alternatively, the illuminance sensor 4 may be used as a proximity sensor too.

The communicator 6 is capable of performing wireless communication. The communicator 6 supports a wireless communication standard. Examples of the wireless communication standard supported by the communicator 6 include, but are not limited to, a cellular phone communication standard such as 2G, 3G, or 4G; and short range wireless communication standard. Examples of the cellular phone communication standard include, but are not limited to, the LTE standard (LTE stands for Long Term Evolution), the W-CDMA standard (W-CDMA stands for Wideband Code Division Multiple Access), the WiMAX (registered trademark) standard (WiMAX stands for Worldwide Interoperability for Microwave Access), the CDMA2000 standard, the PDC standard (PDC stands for Personal Digital Cellular), the GSM (registered trademark) standard (GSM stands for Global System for Mobile Communications), and the PHS standard (PHS stands for Personal Handy-phone System). Examples of the short range wireless communication standard include, but are not limited to, the IEEE 802.11 standard (IEEE stands for The Institute of Electrical and Electronics Engineers, Inc.), Bluetooth (registered trademark), the IrDA standard (IrDA stands for Infrared Data Association), the NFC standard (NFC stands for Near Field Communication), and the WPAN standard (WPAN stands for Wireless Personal Area Network). Moreover, examples of the WPAN standard include, but are not limited to, ZigBee (registered trademark), the DECT standard (DECT stands for Digital Enhanced Cordless Telecommunications), Z-Wave, and the WiSun standard (WiSun stands for Wireless Smart Utility Network). The communicator 6 can support one or more of such communication standards.

The receiver 7 is capable of outputting sound signals, which are transmitted from the controller 10, as sound. For example, the receiver 7 may output sound of videos played in the wearable device 1, sound of music played in the wearable device 1, and voice of a partner on calling. The microphone 8 converts the voice of the user into sound signals and transmits the sound signals to the controller 10.

The storage 9 is capable of storing computer programs and data. The storage 9 may also be used as a work area for temporarily storing processing result of the controller 10. The storage 9 can include an optional non-transitory storage medium such as a semiconductor storage medium or a magnetic storage medium. Alternatively, the storage 9 may include a plurality of types of storage medium. Still alternatively, the storage 9 may include a combination of a storage medium such as a memory card, an optical disk, or a magneto-optical disk and a reading device for the storage medium. Still alternatively, the storage 9 may include a memory device such as a random access memory (RAM) that is used as a temporary storage area.

The computer programs stored in the storage 9 include applications executed either in the foreground or in the background, and basic programs that support the operations of the applications. For example, when an application is executed in the foreground, screens of that application are displayed on the display 2A. The basic programs include an operating system (OS), for example. The applications and the basic programs may be installed in the storage 9 either using the wireless communication performed by the communicator 6 or via a non-transitory storage medium.

The storage 9 can be used to store, for example, a control program 9A, acceleration data 9B, geomagnetic data 9C, angular velocity data 9D, pattern data 9E, and setting data 9Z. The acceleration data 9B contains information related to acceleration values detected by the acceleration sensor 15. The geomagnetic data 9C contains information related to geomagnetic values detected by the geomagnetic sensor 16. The angular velocity data 9D contains information related to angular velocities detected by the angular velocity sensor 17. The pattern data 9E contains information for detecting particular events. Examples of particular events include, but are not limited to, a situation in which the wearable device 1 is inserted in a washing tub. The setting data 9Z contains information related to various settings about the operations of the wearable device 1.

The control program 9A can provide functions related to a variety of control for operating the wearable device 1. For example, the control program 9A controls the communicator 6, the receiver 7, and the microphone 8 so that a telephone call becomes possible. The functions provided by the control program 9A include a function for performing a variety of control such as changing the displayed information, which is displayed on the display 2A, in response to the gesture detected via the touchscreen 2B. Moreover, the functions provided by the control program 9A include a function for determining a state of the wearable device 1 by controlling the acceleration sensor 15, the geomagnetic sensor 16, and the angular velocity sensor 17.

For example, when the user puts the wearable device 1 in a pocket of the clothing and carries it around, there is a possibility that the wearable device 1 is left behind in the removed clothing and is washed in a washing machine. The control program 9A can provide a function of determining whether the wearable device 1 has been inserted in a washing tub. Moreover, the control program 9A can provide a function of notifying, using a predetermined device, that the wearable device 1 has been inserted in a washing tub. Examples of the predetermined device include, but are not limited to, a first device that issues a notification in the wearable device 1 and a second device that is different than the wearable device 1 and that issues a notification from an electronic device. Examples of the first device include, but are not limited to, the speaker 11 and a vibrator in the wearable device 1. Examples of the second device include, but are not limited to, an electronic device capable of communicating with the wearable device 1 present inside a washing tub, and a device of that electronic device. For example, at home, the second device can be such a device in the home which is used daily by the user. Examples of the second device include, but are not limited to, a washing machine, an audio device, a television, and a game console.

The acceleration data 9B contains a plurality of sets of acceleration information transmitted to the controller 10 as the detection results of the acceleration sensor 15. In the acceleration data 9B, the sets of the acceleration information may be arranged in a time series order. A set of the acceleration information contains time and an acceleration value, for example. The time indicates a time of the detection of a direction and magnitude of the acceleration by the acceleration sensor 15. The acceleration value indicates the direction and the magnitude of the acceleration detected by the acceleration sensor 15.

For example, the detection result of the acceleration sensor 15 is transmitted to the controller 10. The detection result includes the acceleration value in the X-axis direction, the acceleration value in the Y-axis direction, the acceleration value in the Z-axis direction, and a vector value obtained by synthesizing all the acceleration values. The controller 10 logs the detection results of the acceleration sensor 15 in the acceleration data 9B in the storage 9. Meanwhile, the controller 10 may calculate the acceleration in the X-axis direction, the acceleration in the Y-axis direction, and the acceleration in the Z-axis direction; and calculate a resultant vector.

The geomagnetic data 9C contains a plurality of sets of geomagnetic information transmitted to the controller 10 as the detection results of the geomagnetic sensor 16. In the geomagnetic data 9C, the sets of the geomagnetic information can be arranged in a time series order. A set of the geomagnetic information contains time and a geomagnetic value, for example. The time indicates a time of the detection of a geomagnetic value by the geomagnetic sensor 16. The geomagnetic value represents a geomagnetic value detected by the geomagnetic sensor 16. The controller 10 logs the detection results of the geomagnetic sensor 16 in the geomagnetic data 9C in the storage 9.

The angular velocity data 9D contains a plurality of sets of angular velocity information transmitted to the controller 10 as the detection results of the angular velocity sensor 17. In the angular velocity data 9D, the sets of the angular velocity may be arranged in a time series order. The angular velocity information contains a time and an angular velocity value, for example. The time indicates a time of the detection of the angular velocity value by the angular velocity sensor 17. The angular velocity value represents an angular velocity value detected by the angular velocity sensor 17. The controller 10 logs the detection results of the angular velocity sensor 17 in the angular velocity data 9D in the storage 9.

The pattern data 9E contains pattern information that acts on the wearable device 1 when the wearable device 1 is inserted in a washing tub. For example, the pattern information contains information indicating patterns such as geomagnetic patterns, angular velocity patterns, and acceleration patterns corresponding to the types of washing machines. Herein, it is also possible to make the user to select or input the type of washing machine. For example, the pattern data 9E may be set as data downloaded based on the type of washing machine. For example, the pattern data 9E may be set as data indicating a detection result by a sensor that is actually obtained by the wearable device 1 inside the washing machine while working without using water. Alternatively, for example, the pattern data 9E may be set as pattern data received by the wearable device 1 from the washing machine.

The setting data 9Z contains a variety of data used in the operations performed based on the functions provided by the control program 9A.

The controller 10 can integrally control the operations of the wearable device 1 and implement various functions. The controller 10 includes a processing device, examples of which include, but are not limited to, a central processing unit (CPU), a System-on-a-Chip (SoC), a micro control unit (MCU), a field-programmable gate array (FPGA), and a coprocessor. However, the controller 10 is not limited to those examples. The SoC may have other constituent elements such as the communicator 6 integrated therein. Meanwhile, the controller 10 is an example of a controller.

More particularly, the controller 10 can execute commands specified in the computer programs stored in the storage 9. The controller 10 can refer to the data, which is stored in the storage 9, as may be necessary. The controller 10 controls the functional modules according to the data and the commands. As a result of controlling the functional modules, the controller 10 implements various functions. The functional modules include the display 2A, the communicator 6, the receiver 7, and the speaker 11, but are not limited thereto. The controller 10 sometimes alters the control according to the detection result of detecting modules. The detecting modules include, for example, the touchscreen 2B, the button 3, the illuminance sensor 4, the proximity sensor 5, the microphone 8, the cameras 12 and 13, the acceleration sensor 15, the geomagnetic sensor 16, the angular velocity sensor 17, and the GPS receiver 18. However, those are not the only possible examples.

The controller 10 executes the control program 9A and, in response to the gesture detected via the touchscreen 2B, may perform a variety of control such as changing the information being displayed on the display 2A.

As a result of executing the control program 9A, the controller 10 operates in cooperation with the acceleration sensor 15, the geomagnetic sensor 16, the angular velocity sensor 17, and the GPS receiver 18. Based on the detection results of at least two sensors from among the acceleration sensor 15, the geomagnetic sensor 16, and the angular velocity sensor 17; the controller 10 can determine whether the wearable device 1 is inside the washing tub. For example, if the pattern indicated by the detection result of at least one of the sensors from among the acceleration sensor 15, the geomagnetic sensor 16, and the angular velocity sensor 17 matches with the pattern information, the controller 10 can determine that the wearable device 1 is inside the washing tub. Alternatively, based on the position information received by the GPS receiver 18, the controller 10 can detect that the wearable device 1 is present at the location of the washing machine in the house.

The speaker 11 outputs the sound signals, which are transmitted from the controller 10, as sound. For example, the speaker 11 may output ringtone or music. The receiver 7 may have the function of the speaker 11, or the speaker 11 may have the function of the receiver 7.

The cameras 12 and 13 can convert a taken image into an electric signal. The camera 12 may be a front side camera that captures an object facing the display 2A. The camera 13 may be a rear side camera that captures an object facing the opposite face to the display 2A. The cameras 12 and 13 may be installed in the wearable device 1 in a functionally-and-physically integrated state as a camera unit which can be switched to be used as the front side camera and the rear side camera.

The connector 14 includes a terminal for establishing connection with another device. The connector 14 may include a universal terminal such as a universal serial bus (USB), a high-definition multimedia interface (HDMI) (registered trademark), Light Peak (Thunderbolt (registered trademark)), or an earphone-microphone connector. Alternatively, the connector 14 may be a dedicated terminal such as a Dock connector. Examples of the device that can be connected to the connector 14 include, but are not limited to, an external storage, a speaker, and a communication device.

The acceleration sensor 15 can detect a direction and magnitude of acceleration acting on the wearable device 1. Moreover, the acceleration sensor 15 may send the detected acceleration value to the controller 10. Based on the direction and the magnitude of the acceleration detected by the acceleration sensor 15 or based on an acceleration pattern including the time series variation of the direction and the magnitude of the acceleration, the controller 10 can detect changes in a state of movement of the wearable device 1.

The geomagnetic sensor 16 can measure, for example, geomagnetism and detect an orientation and magnitude of the magnetic field. Moreover, the geomagnetic sensor 16 may send the detected geomagnetic value to the controller 10. The geomagnetic sensor 16 may be a biaxial sensor or a triaxial sensor. Based on the geomagnetic value detected by the geomagnetic sensor 16, the controller 10 can detect changes in the geomagnetic value.

The angular velocity sensor 17 can detect, for example, magnitude and a direction of the angular velocity of the wearable device 1. Moreover, the angular velocity sensor 17 may send the detected angular velocity value to the controller 10. Based on the angular velocity value detected by the angular velocity sensor 17, the controller 10 can detect changes in the angular velocity value.

The GPS receiver 18 can detect the current location of the wearable device 1. The GPS receiver 18 represents an example of a receiving unit. The GPS receiver 18 may perform demodulation of the received radio signals and transmit the demodulated signals to the controller 10. In the embodiments, although the explanation is given for a case in which the wearable device 1 includes the GPS receiver 18, it is not the only possible case. Alternatively, for example, the wearable device 1 may detect its current location based on a base station used in wireless communication by the communicator 6. In that case, the communicator 6 represents an example of a receiving unit. For example, the wearable device 1 may detect its current location by implementing a plurality of methods in combination.

The controller 10 can use the output of the acceleration sensor 15, the geomagnetic sensor 16, and the angular velocity sensor 17 in combination. As a result of using the output of a plurality of sensors in combination, the wearable device 1 becomes able to perform, using the controller 10, control in which the movement and the state of the wearable device 1 is highly reflected. Meanwhile, the acceleration sensor 15, the geomagnetic sensor 16, and the angular velocity sensor 17 may be used as a single motion sensor.

With reference to FIG. 1, some or all of the computer programs and data stored in the storage 9 can be downloaded from another device via the wireless communication performed by the communicator 6. Alternatively, with reference to FIG. 1, some or all of the computer programs and data stored in the storage 9 can be stored in a non-transitory storage medium that is readable by a reading device included in the storage 9. Still alternatively, with reference to FIG. 1, some or all of the computer programs and data stored in the storage 9 can be stored in a non-transitory storage medium that is readable by a reading device connected to the connector 14. Examples of a non-transitory storage medium include, but are not limited to, an optical disk such as a compact disk (CD) (registered trademark), a digital versatile disk (DVD), or a Blu-ray (registered trademark) disk; a magneto-optical disk; a magnetic storage medium; a memory card; and a solid-state storage medium.

Figure 2:
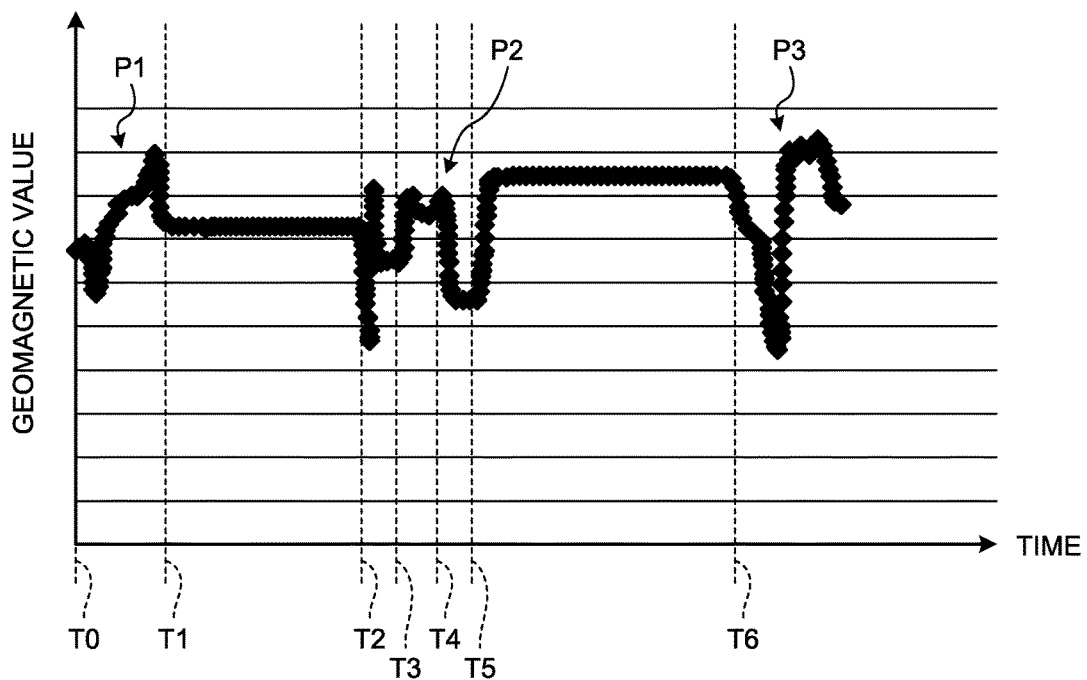
FIG. 2 is a diagram illustrating a relationship between geomagnetic value and time.

FIG. 2 is a diagram illustrating a relationship between geomagnetic value and time. With reference to FIG. 2, the explanation is given for an example of the geomagnetism acting on the wearable device 1 when the wearable device 1 is inserted in the washing tub of the washing machine. The geomagnetic value illustrated in FIG. 2 indicates magnitude of the geomagnetism.

The washing machine has a metallic washing tub, for example. The washing machine includes, for example, an amount-of-clothing detection process, a water supplying process, and an agitating wash process. The amount-of-clothing detection process includes, in response to operation of a start button of the washing machine, detecting the amount of laundry put in the washing tub of the washing machine to decide on the quantity of water. The water supplying process includes providing water with the quantity decided by the washing machine to the washing tub. The agitating wash process includes controlling rotation of the washing tub of the washing machine according to the water supply to the washing tub, and washing the laundry in an agitating fashion. The processes of the washing machine as described above are only some of the processes.

In the example illustrated in FIG. 2, at a timing T0, for example, the wearable device 1 gets inserted in the washing tub in a state of being put in a pocket of the clothing of the user or in a state of being clipped to the clothing of the user. If the washing tub is metallic, when the wearable device 1 gets inserted in the washing tub, the magnetic flux density around the wearable device 1 changes. In that case, the wearable device 1 can detect a geomagnetic pattern P1 using the geomagnetic sensor 16. The geomagnetic pattern P1 represents a pattern in which the geomagnetic value changes due to the insertion of the wearable device 1 in the washing tub. When the pattern of the change of the geomagnetic value detected by the geomagnetic sensor 16 matches with the geomagnetic pattern P1, the wearable device 1 can determine that it is likely to have been inserted in the washing tub. The matching of the pattern may include, for example, a matching completely or a matching at a predetermined ratio.

At a timing T1, when the power supply is turned ON, the washing machine waits for the operation of the start button. When the start button is operated, the washing machine switches to the amount-of-clothing detection process. In the amount-of-clothing detection process, the washing machine reverses the rotation of the washing tub at timings T2, T3, T4, and T5. For example, the washing machine rotates the washing tub in a predetermined rotation pattern. As a result, the laundry in the washing tub is loosened due to the rotation of the washing tub, and the amount of the clothing is detected.

In the amount-of-clothing detection process of the washing machine, the wearable device 1 can detect a geomagnetic pattern P2 using the geomagnetic sensor 16. The geomagnetic pattern P2 represents a pattern in which the geomagnetic value changes due to the rotation of the washing tub. Every rotation performed by the washing machine includes a predetermined amount of the rotation and a predetermined pattern. Moreover, the rotation performed by the washing machine includes a rotation unique to the washing machine. When the pattern of the change of the geomagnetic value detected by the geomagnetic sensor 16 matches with the geomagnetic pattern P2, the wearable device 1 can determine that there is a possible attempt of washing while the wearable device 1 is inside the washing tub.

At a timing T6, the wearable device 1 is taken out from the washing tub of the washing machine that has been stopped. When the wearable device 1 is taken out from the washing tub, the magnetic flux density around the wearable device 1 changes. In that case, the wearable device 1 can detect a geomagnetic pattern P3 using the geomagnetic sensor 16. The geomagnetic pattern P3 represents a pattern in which the geomagnetic value changes due to taking out the wearable device 1 from the washing tub. When the pattern of the change of the geomagnetic value detected by the geomagnetic sensor 16 matches with the geomagnetic pattern P3, the wearable device 1 can determine that it is likely to have been taken out from the washing tub.

Figure 3:
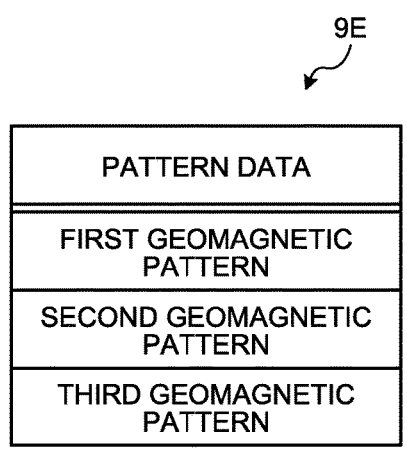
FIG. 3 is a diagram illustrating an example of pattern data.

FIG. 3 is a diagram illustrating an example of the pattern data 9E. An example of the pattern data 9E that is referred to by the wearable device 1 is explained below with reference to FIG. 3.

In the example illustrated in FIG. 3, the pattern data 9E contains a first geomagnetic pattern, a second geomagnetic pattern, and a third geomagnetic pattern. The first geomagnetic pattern includes, for example, information indicating the geomagnetic pattern P1 when the wearable device 1 is inserted in the washing tub. The second geomagnetic pattern includes, for example, information indicating the geomagnetic pattern P2 during the amount-of-clothing detection process of the washing machine. The third geomagnetic pattern includes, for example, information indicating the geomagnetic pattern P3 when the wearable device 1 is taken out from the washing tub. Regarding the pattern data 9E, the data measured by the geomagnetic sensor 16 of the wearable device 1 which is actually inserted in the washing machine are set as the first, the second, and the third geomagnetic patterns.

The wearable device 1 can compare the pattern of the change of the geomagnetic value detected by the geomagnetic sensor 16 with the first geomagnetic pattern or the second geomagnetic pattern and can determine whether it has been inserted in the washing tub before the washing machine starts the washing actually. As a result, for example, the wearable device 1 can raise the possibility of avoiding getting washed inside the washing tub with a detergent or avoiding submerging into water in the washing tub. Moreover, the wearable device 1 can compare the pattern of the change of the geomagnetic value detected by the geomagnetic sensor 16 with the third geomagnetic pattern, and can determine whether it has been taken out from the washing tub.

In the embodiments, although the explanation is given for a case in which the pattern data 9E contains the three geomagnetic patterns, it is not the only possible case. Alternatively, the pattern data 9E may contain patterns the amount of which is different from three. For example, a washing machine which does not have the amount-of-clothing detection process may be provided. In that case, the pattern data 9E can contain a geomagnetic pattern that indicates change in the geomagnetic value while washing with detergent in the washing tub. Thus, the pattern data 9E may include geomagnetic pattern according to the type of the washing machine used by the user who has the wearable device 1.

Figure 4:
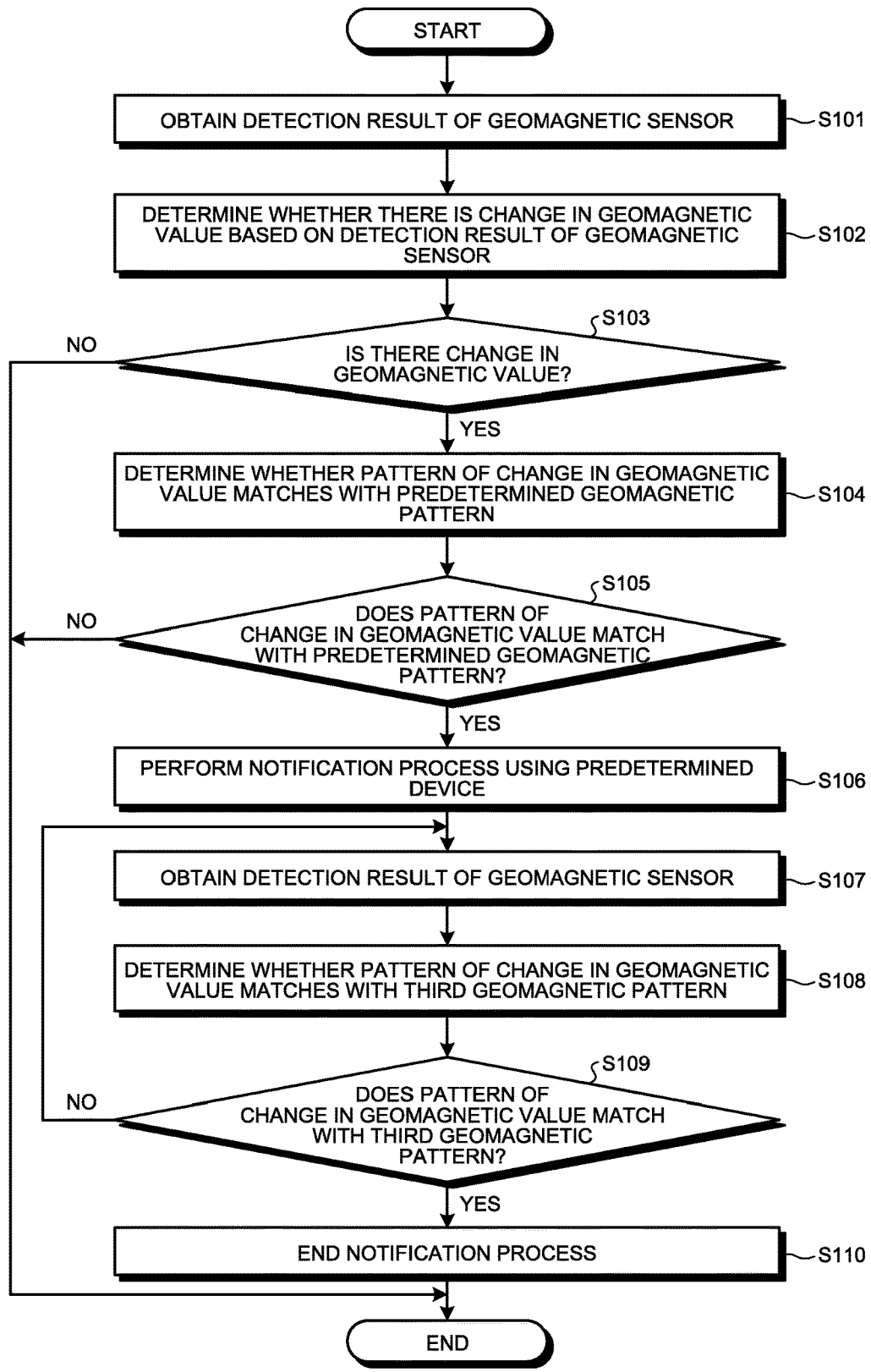
FIG. 4 is a flowchart for explaining an exemplary sequence of operations for control performed by the wearable device.

FIG. 4 is a flowchart for explaining an exemplary sequence of the operations for the control performed by the wearable device 1. The sequence of the operations illustrated in FIG. 4 is implemented upon the execution of the control program 9A by the controller 10. The sequence of the operations illustrated in FIG. 4 is repetitively implemented by the controller 10.

As illustrated in FIG. 4, at Step S101, the controller 10 of the wearable device 1 obtains the detection result of the geomagnetic sensor 16. For example, the controller 10 can obtain, from the geomagnetic data 9C in the storage 9, the data for a period for determining the geomagnetic pattern. The controller 10 can order the geomagnetic sensor 16 to detect the latest value, and obtain data containing the detection result from the geomagnetic data 9C.

At Step S102, the controller 10 determines whether there is a change in the geomagnetic value based on the detection result of the geomagnetic sensor 16. For example, if the geomagnetic value exceeds a predetermined threshold value, the controller 10 determines that the geomagnetic value has changed based on the geomagnetic data 9C. When it is determined that there is no change in the geomagnetic value (No at Step S103), then the controller 10 ends the sequence of the operations illustrated in FIG. 4. When it is determined that there is a change in the geomagnetic value (Yes at Step S103), then the controller 10 proceeds to Step S104.

At Step S104, the controller 10 determines whether the pattern of the change of the geomagnetic value matches with a predetermined geomagnetic pattern. For example, when the pattern of the change of the geomagnetic value matches with at least one of the first geomagnetic pattern and the second geomagnetic pattern, the controller 10 determines that the pattern matches with the predetermined geomagnetic pattern. For example, when the pattern of the change of the geomagnetic value matches with the second geomagnetic pattern of the pattern data 9E, the controller 10 determines that the pattern matches with the predetermined geomagnetic pattern. The second geomagnetic pattern is a geomagnetic pattern corresponding to the amount-of-clothing detection process of the washing machine. Thus, the second geomagnetic pattern is a geomagnetic pattern which is unique in the washing machine. When it is determined that the pattern does not match with the predetermined geomagnetic pattern (No at Step S105), then the controller 10 ends the sequence of the operations illustrated in FIG. 4. When it is determined that the pattern matches with the predetermined geomagnetic pattern (Yes at Step S105), then the controller 10 proceeds to Step S106.

At Step S106, the controller 10 performs a notification process using a predetermined device. For example, when the speaker 11 of the wearable device 1 is used as the predetermined device, then the controller 10 orders the speaker 11 to output a notification sound or a voice for notifying that the wearable device 1 is inside the washing tub. As a result, the wearable device 1 can make the user, who is present around the washing machine, to recognize that the wearable device 1 is inside the washing tub. Alternatively, for example, when another electronic device is used as the predetermined device, then the controller 10 performs communication with the predetermined device via the communicator 6 and orders the predetermined device to output the notification sound or the voice. As a result, the wearable device 1 can make the user, who is present at a location away from the washing machine, to recognize that the wearable device 1 is inside the washing tub. After performing the notification process, the controller 10 proceeds to Step S107 while continuing the notification.

At Step S107, the controller 10 obtains the detection result of the geomagnetic sensor 16. At that time, the notification issued by the predetermined device is continuing. At Step S108, the controller 10 determines whether the pattern of the change of the geomagnetic value matches with the third geomagnetic pattern. For example, when the pattern of the change of the geomagnetic value is determined to match with the third geomagnetic pattern of the pattern data 9E, then the controller 10 determines that the pattern matches with the third geomagnetic pattern. When it is determined that the pattern matches with the third geomagnetic pattern, then the controller 10 assumes that the wearable device 1 has been taken out from the washing tub. However, when it is determined that the pattern does not match with the third geomagnetic pattern (No at Step S109), then the controller 10 returns to Step S107 described above. Meanwhile, when it is determined that the pattern matches with the third geomagnetic pattern (Yes at Step S109), the controller 10 proceeds to Step S110.

At Step S110, the controller 10 ends the notification process. For example, when the speaker 11 is used as the predetermined device, the controller 10 orders the speaker 11 to stop outputting the notification sound or the voice. Alternatively, for example, when another electronic device is used as the predetermined device, the controller 10 performs the communication with the predetermined device via the communicator 6 and orders the predetermined device to stop outputting the notification sound or the voice. Once the notification process is ended, the controller 10 ends the sequence of the operations illustrated in FIG. 4.

In the above embodiments, when it is determined that the pattern of the change of the geomagnetic value matches with the predetermined geomagnetic pattern; the wearable device 1 can perform the notification for the user using the predetermined device. As a result, the wearable device 1 can make the user to recognize that the wearable device 1 is inside the washing machine. As a result of making the user to recognize that the wearable device 1 is inside the washing machine, the wearable device 1 can avoid being washed. Moreover, by notifying that the pattern of the change of the geomagnetic value matches with the second geomagnetic pattern, the wearable device 1 can avoid submerging into the water in the washing tub.

Figure 5:
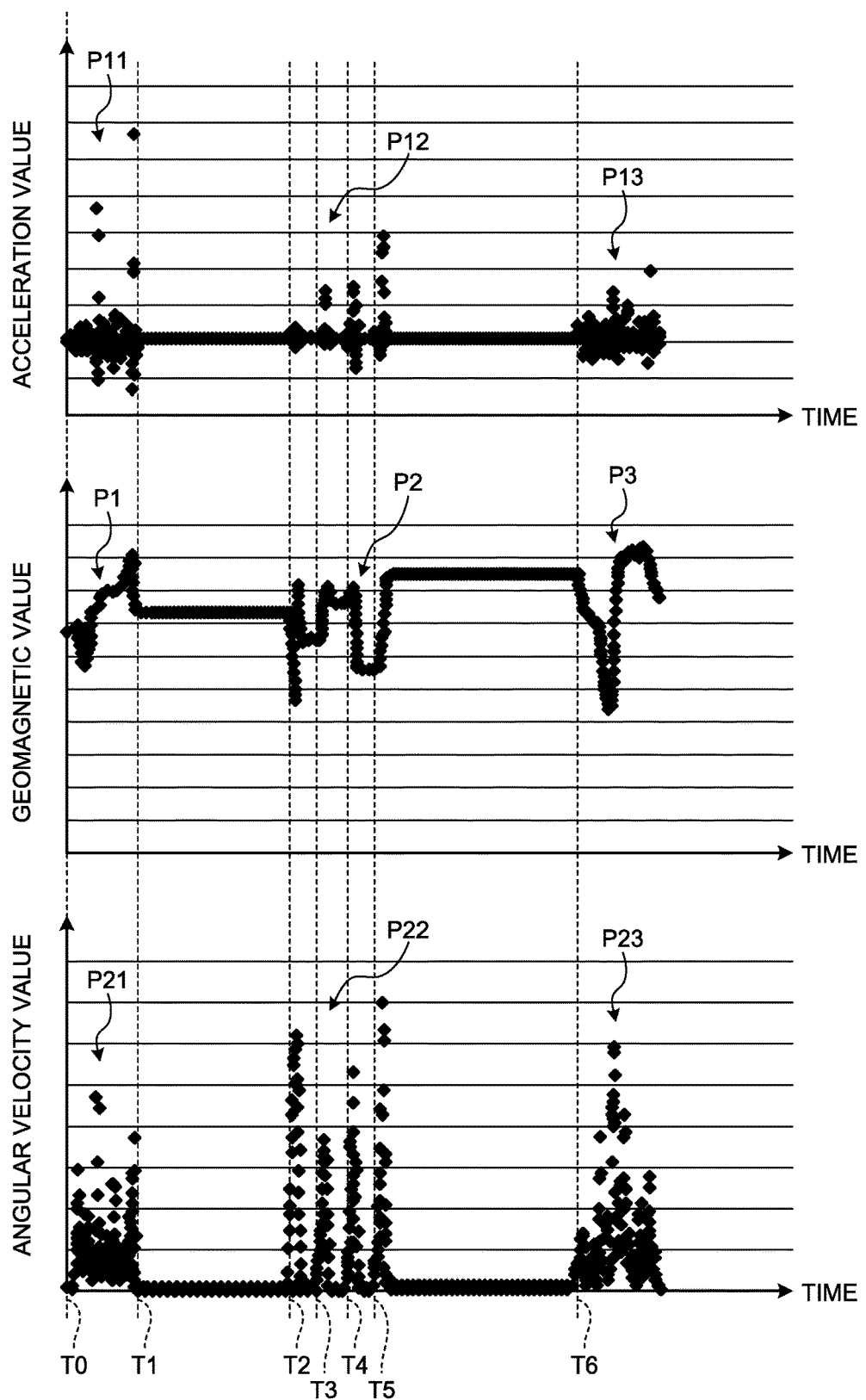
FIG. 5 is a diagram illustrating an example of a relationship between geomagnetic value, acceleration value, and angular velocity value.

FIG. 5 is a diagram illustrating an example of the relationship between the geomagnetic value, the acceleration value, and the angular velocity value. With reference to FIG. 5, the explanation is given for an example of the detection result obtained by the wearable device 1 when it gets inserted in the washing tub of the washing machine. In FIG. 5, an example of the geomagnetic value, the acceleration value, and the angular velocity value detected by the wearable device 1 is illustrated when the clothing with the wearable device 1 being attached thereto is inserted in the washing tub.

In the example illustrated in FIG. 5, at the timing T0, for example, the wearable device 1 gets inserted in the washing tub in a state of being put in a pocket of the clothing of the user or in a state of being clipped to the clothing of the user. The wearable device 1 can detect the geomagnetic pattern P1 using the geomagnetic sensor 16. In that case, the wearable device 1 can detect an acceleration pattern P11 using the acceleration sensor 15 and can detect an angular velocity pattern P21 using the angular velocity sensor 17. The timing of the change in the geomagnetic pattern P1, the timing of the change of the acceleration pattern P11, and the timing of the change of the angular velocity pattern P21 synchronize with each other in the time axis.

When the pattern of the change of the detected geomagnetic value matches with the geomagnetic pattern P1, the wearable device 1 determines whether the timing of the change in the geomagnetic value synchronizes with at least one of the timing of the change in the detected acceleration value and the timing of the change in the detected angular velocity value. As a result, in the wearable devices 1, accuracy of the determination that the wearable device 1 gets inserted in the washing tub can be increased, due to the determination by combining the detection result of the geomagnetic value with the detection result of the acceleration value and the detection result of the angular velocity value.

At the timing T1, when the power supply is turned ON, the washing machine waits for the operation of the start button. When the start button is operated, the washing machine proceeds to the amount-of-clothing detection process. In the amount-of-clothing detection process, the washing machine reverses the rotation of the washing tub at the timings T2, T3, T4, and T5. For example, the washing machine rotates the washing tub in different directions with a predetermined amount of the rotation. As a result, the laundry in the washing tub is loosened due to the rotation of the washing tub, and the amount of the clothing is detected.

In the amount-of-clothing detection process of the washing machine, the wearable device 1 can detect the geomagnetic pattern P2 using the geomagnetic sensor 16. In that case, the wearable device 1 can detect an acceleration pattern P12 using the acceleration sensor 15 and can detect an angular velocity pattern P22 using the angular velocity sensor 17. The timing of the change in the geomagnetic pattern P1, the timing of the change in the acceleration pattern P11, and the timing of the change in the angular velocity pattern P21 according to the rotation of the washing tub of the washing machine synchronize with each other in the time axis.

When the pattern of the change of the detected geomagnetic value matches with the geomagnetic pattern P2, the wearable device 1 determines whether the timing of the change in the geomagnetic value synchronizes with at least one of the timing of the change in the detected acceleration value and the timing of the change in the detected angular velocity value. As a result, the accuracy of the determination that the wearable device 1 is inside the washing tub can be increased.

At the timing T6, the wearable device 1 is taken out from the washing tub of the washing machine that has been stopped. The wearable device 1 can detect the geomagnetic pattern P3 using the geomagnetic sensor 16. In that case, the wearable device 1 can detect an acceleration pattern P13 using the acceleration sensor 15 and can detect an angular velocity pattern P23 using the angular velocity sensor 17. The timing of the change in the geomagnetic pattern P3, the timing of the change in the acceleration pattern P13, and the timing of the change in the angular velocity pattern P23 synchronizes with each other in the time axis.

When the pattern of the change of the detected geomagnetic value matches with the geomagnetic pattern P3, the wearable device 1 determines whether the timing of the change in the geomagnetic value synchronizes with at least one of the timing of the change in the detected acceleration value and the timing of the change in the detected angular velocity value. As a result, the accuracy of the determination that the wearable device 1 has been taken out from the washing tub can be increased.

Figure 6:
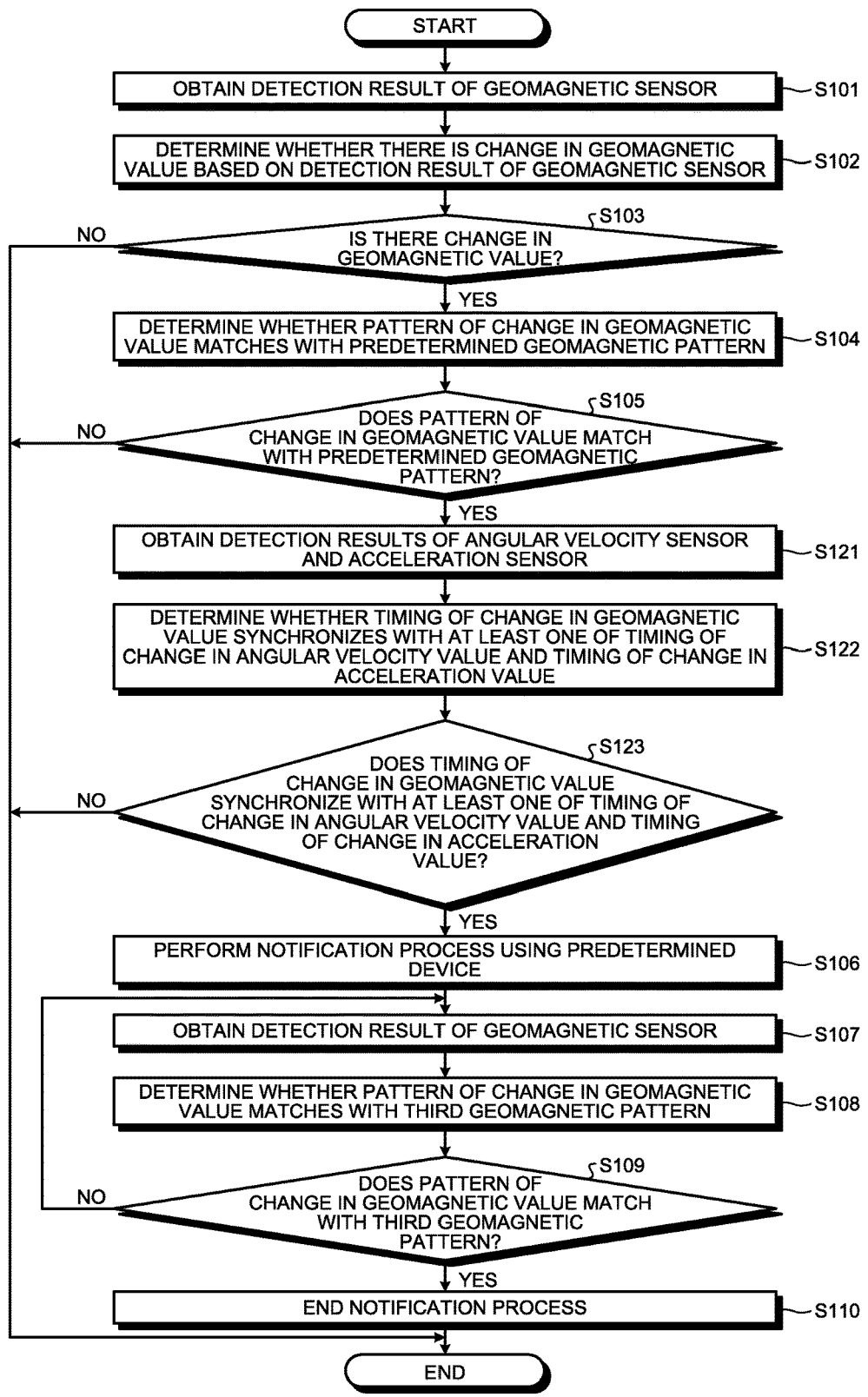
FIG. 6 is a flowchart for explaining another example of the sequence of the operations for the control performed by the wearable device.

FIG. 6 is a flowchart for explaining another example of the sequence of the operations for the control performed by the wearable device 1. The sequence of the operations illustrated in FIG. 6 is implemented upon the execution of the control program 9A by the controller 10. The sequence of the operations illustrated in FIG. 6 is repetitively implemented by the controller 10.

In the example illustrated in FIG. 6, the operations from Steps S101 to S105 and the operations from Steps S106 to S110 are identical to the operations from Steps S101 to S105 and the operations from Steps S106 to S110 illustrated in FIG. 4. Hence, the following explanation is given only for the differing portion, and the explanation of the same portion is omitted.

When it is determined that the pattern of the change of the geomagnetic value matches with the predetermined geomagnetic pattern (Yes at Step S105), then the controller 10 proceeds to Step S121. At Step S121, the controller 10 obtains the detection results of the angular velocity sensor 17 and the acceleration sensor 15. For example, the controller 10 can obtain the data enabling the determination of the timing of the change in the angular velocity value from the angular velocity data 9D. Moreover, for example, the controller 10 can obtain the data enabling the determination of the timing of the change in the acceleration value from the acceleration data 9B. After obtaining the detection results, the controller 10 proceeds to Step S122.

At Step S122, the controller 10 determines whether the timing of the change in the geomagnetic value synchronizes with at least one of the timing of the change in the angular velocity value and the timing of the change in the acceleration value. For example, when at least one of the timing of the change in the angular velocity value and the timing of the change in the acceleration value coincides with or are close to the timing of the change in the geomagnetic value, then the controller 10 determines that their timings synchronize with each other. When it is determined that their timings does not synchronize each other (No at Step S123), then the controller 10 ends the sequence of the operations illustrated in FIG. 6. When it is determined that their timings synchronizes each other (Yes at Step S123), then the controller 10 proceeds to Step S106 described above. Subsequently, the controller 10 performs the operations from Step S106 to Step S110 as described above.

In the above embodiments, in addition to performing a first determination of determining whether the pattern of the change of the geomagnetic value matches with the predetermined geomagnetic pattern, the wearable device 1 can perform a second determination of determining whether the timing of the change in the geomagnetic value synchronizes with at least one of the timing of the change in the acceleration value and the timing of the change in the angular velocity value. Thus, the accuracy of the determination that the wearable device 1 is inside the washing tub can be increased based on the pattern of the change of the geomagnetic value and the timing of the change in the geomagnetic value. As a result, it becomes possible to avoid a situation in which a notification that the wearable device is inside the washing machine is mistakenly issued when the wearable device is not in the washing machine.

Figure 7:
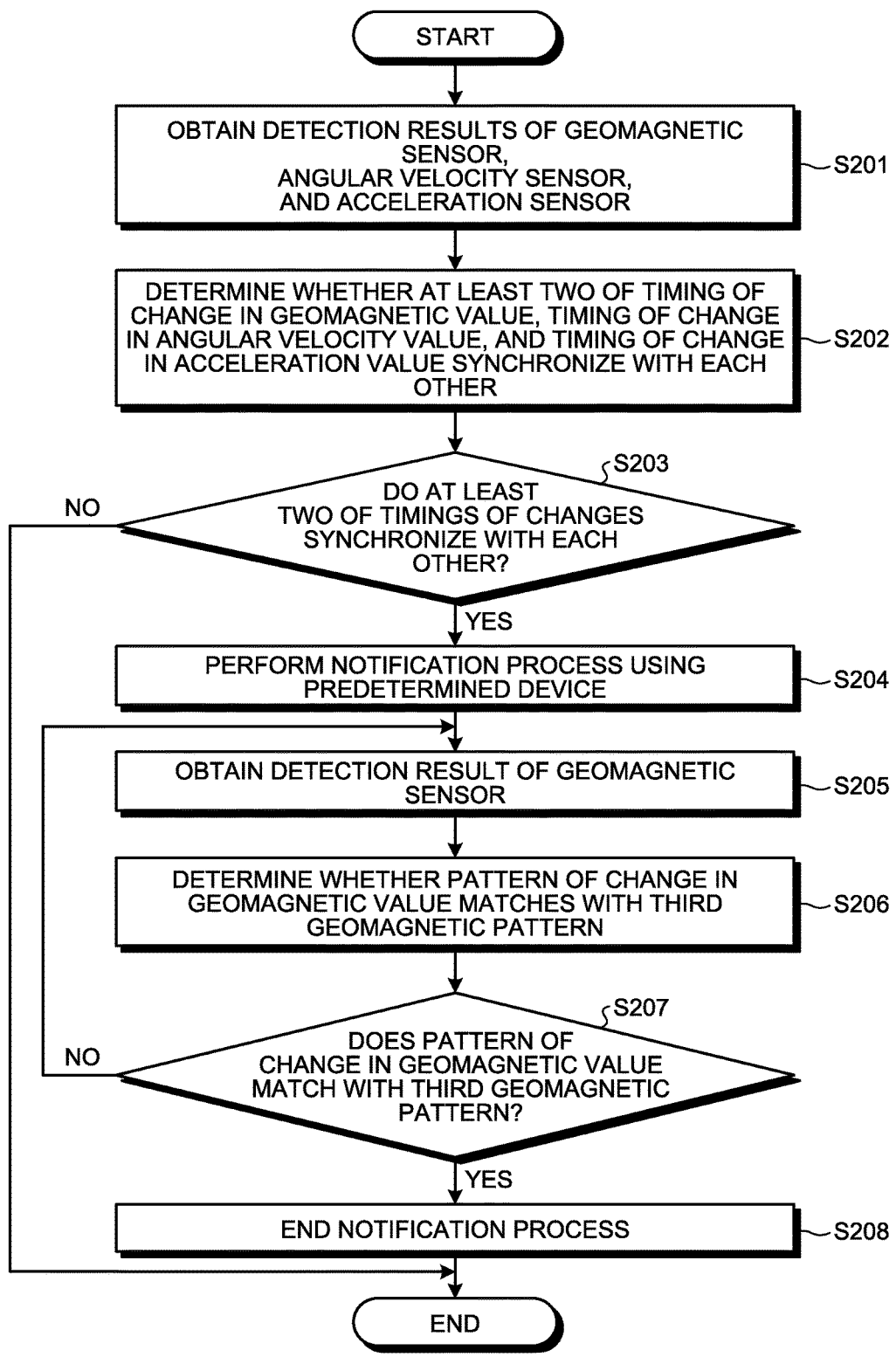
FIG. 7 is a flowchart for explaining still another example of the sequence of operations for control performed by the wearable device.

FIG. 7 is a flowchart for explaining still another example of the sequence of the operations for the control performed by the wearable device 1. The sequence of the operations illustrated in FIG. 7 is implemented upon the execution of the control program 9A by the controller 10. The sequence of the operations illustrated in FIG. 7 is repetitively implemented by the controller 10.

As illustrated in FIG. 7, at Step S201, the controller 10 of the wearable device 1 obtains the detection result of the geomagnetic sensor 16, the angular velocity sensor 17, and the acceleration sensor 15. At Step S202, the controller 10 determines whether at least two of the timing of the change in the geomagnetic value, the timing of the change in the angular velocity value, and the timing of the change in the acceleration value synchronize with each other. For example, when at least two of the changes in the values are detected, the controller 10 compares the timings of the changes detected. Based on the comparison result, when at least two of the timings of the changes of the values are close to each other, then the controller 10 determines that at least two of the timings of the changes synchronize with each other. When at least two of the changes in the values are not detected or when the timings of changes are not close to each other, the controller 10 determines that at least two of the timings of the changes do not synchronize with each other. When it is determined that at least two of the timings of the changes do not synchronize with each other (No at Step S203), then the controller 10 ends the sequence of the operations illustrated in FIG. 7. When it is determined that at least two of the timings of changes synchronize with each other (Yes at Step S203), then the controller 10 proceeds to Step S204.

At Step S204, the controller 10 performs the notification process using the predetermined device. For example, when the speaker 11 of the wearable device 1 is used as the predetermined device, then the controller 10 orders the speaker 11 to output the notification sound or the voice notifying that the wearable device 1 is inside the washing tub. As a result, the wearable device 1 can make the user, who is present around the washing machine, to recognize that the wearable device 1 is inside the washing tub. Alternatively, for example, when some other electronic device is used as the predetermined device, then the controller device performs the communication with the predetermined device via the communicator 6 and orders the predetermined device to output the notification sound or the voice. As a result, the wearable device 1 can make the user, who is present at a location away from the washing machine, to recognize that the wearable device 1 is inside the washing tub. After performing the notification process, the controller 10 proceeds to Step S205 while continuing the notification.

At Step S205, the controller 10 obtains the detection result of the geomagnetic sensor 16. At that time, the notification issued by the predetermined device is continuing. At Step S206, the controller 10 determines whether the pattern of the change of the geomagnetic value matches with the third geomagnetic pattern. For example, when the pattern of the change of the geomagnetic value is determined to match with the third geomagnetic pattern of the pattern data 9E, then the controller 10 determines that the pattern matches with the third geomagnetic pattern. When it is determined that the pattern does not match with the third geomagnetic pattern (No at Step S207), then the controller 10 returns to Step S205 described above. When it is determined that the pattern matches with the third geomagnetic pattern (Yes at Step S207), then the controller 10 proceeds to Step S208.

At Step S208, the controller 10 ends the notification process. For example, when the speaker 11 is used as the predetermined device, the controller 10 orders the speaker 11 to stop outputting the notification sound or the voice. Alternatively, for example, when some other electronic device is used as the predetermined device, the controller 10 performs the communication with the predetermined device via the communicator 6 and orders the predetermined device to stop outputting the notification sound or the voice. Once the notification process is ended, the controller 10 ends the sequence of the operations illustrated in FIG. 7.

In the above embodiments, when it is determined that at least two of the timings of the change in the geomagnetic value, the timing of the change in the angular velocity value, and the timing of the change in the acceleration value synchronize with each other, the wearable device 1 can inform the user using the predetermined device of the notification. As a result, the wearable device 1 can make the user to recognize that the wearable device 1 is inside the washing tub. As a result of making the user to recognize that the wearable device 1 is inside the washing machine, the wearable device 1 can avoid being washed.

In the above embodiments, the explanation is given for a case in which the wearable device 1 determines whether it has been taken out from the washing tub when the notification process is performed using the predetermined device. However, that is not the only possible case. Alternatively, for example, without determining whether the wearable device 1 has been taken out from the washing tub, the wearable device 1 can make the user to stop the notification.

In the above embodiments, the explanation is given for a case in which the wearable device 1 determines whether at least two of the detected value of the geomagnetic sensor 16, the detected value of the angular velocity sensor 17, and the detected value of the acceleration sensor 15 synchronize with each other (in synchronization). However, that is not the only possible case. Alternatively, for example, the wearable device 1 can determine whether the detected values of predetermined two sensors synchronize with each other (in synchronization). The predetermined two sensors may be selected to be used according to, for example, the type of the washing machine and material of the washing tub.

In the above embodiments, the explanation is given for a case in which the wearable device 1 determines the pattern of the change of the geomagnetic value. However, that is not the only possible case. Alternatively, for example, as illustrated in FIG. 5, when the wearable device 1 gets inserted in the washing machine, the acceleration value and the angular value also change like the geomagnetic value. Moreover, there may be provided a washing machine the washing tub of which is not metallic. Thus, for example, the wearable device 1 can determine whether it performs the notification for the user using some other device based on at least one of the pattern of the change of the angular velocity value and the pattern of the change of the acceleration value. That is, in the above embodiments, the wearable device 1 can substitute the geomagnetic value with at least one of the acceleration value and the angular velocity value. For example, the pattern of the change of the acceleration value according to the rotation of the washing tub includes an acceleration pattern. In the acceleration pattern, the acceleration value in the first direction of the two directions intersecting with the direction of gravitational force varies in positive and negative values, and the acceleration value in the second direction varies in either positive values or negative values. In that case, the wearable device 1 can perform the determination based on the acceleration patterns in the first direction and the second direction.

In the above embodiments, the explanation is given for a case in which the washing machine includes the amount-of-clothing detection process. However, that is not the only possible case. Alternatively, for example, when the washing machine does not include the amount-of-clothing detection process, then the wearable device 1 can determine whether the wearable device 1 is inside the washing tub based on the detection result of the sensors during a process in which the washing tub is rotated.

In the above embodiments, the explanation is given about the wearable device 1 as an example of the mobile device. However, the mobile device according to the appended claims is not limited to a wearable device. That is, the mobile device according to the appended claims may be some other mobile electronic device other than a wearable device. Examples of the mobile device include, but are not limited to, a smartphone, a mobile phone, a tablet, a digital camera, a smartwatch, a media player, an e-book reader, a navigator, and a game console. However, those are not the only possible examples.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A mobile device, comprising:
    a geomagnetic sensor configured to detect a geomagnetic value; and
    at least one controller configured to perform a notification for a user using a predetermined device when the at least one controller determines, via a first determination that a pattern of a change of the geomagnetic value detected by the geomagnetic sensor matches with a predetermined geomagnetic pattern, that the mobile device is inserted in a washing machine.

2. The mobile device according to claim 1, further comprising an angular velocity sensor configured to detect an angular velocity value, wherein
    the at least one controller is configured to perform the notification for the user using the predetermined device when the at least one controller determines via synchronization of timing of the change of the geomagnetic value and timing of a change in the angular velocity value, in addition to the first determination, that the mobile device is inserted in a washing machine.

3. The mobile device according to claim 1, further comprising an acceleration sensor configured to detect an acceleration value, wherein
    the at least one controller is configured to perform the notification for the user using the predetermined device when the at least one controller determines, via synchronization of timing of the change of the geomagnetic value and timing of a change in the acceleration value, in addition to the first determination, that the mobile device is inserted in a washing machine.

4. The mobile device according to claim 1, further comprising:
    an angular velocity sensor configured to detect an angular velocity value; and
    an acceleration sensor configured to detect an acceleration value, wherein
    the at least one controller is configured to perform the notification for the user using the predetermined device when the at least one controller determines, via synchronization of timing of the change of the geomagnetic value and synchronizes with at least one of timing of a change in the angular velocity value and timing of a change in the acceleration value, in addition to the first determination, that the mobile device is inserted in a washing machine.

5. The mobile device according to claim 1, wherein the at least one controller is configured to perform the notification for the user when the at least one controller determines that the pattern of the change of the geomagnetic value matches with a second geomagnetic pattern different from the predetermined geomagnetic pattern.

6. The mobile device according to claim 5, wherein the predetermined geomagnetic pattern and the second geomagnetic pattern are set to different kinds of the washing machine.

7. A mobile device, comprising:
a geomagnetic sensor configured to detect a geomagnetic value;
an angular velocity sensor configured to detect an angular velocity value;
an acceleration sensor configured to detect an acceleration value; and
at least one controller configured to perform a notification for a user using a predetermined device when the at least one controller determines, via a determination that at least two of timing of a change in the geomagnetic value, timing of a change in the angular velocity value, and timing of a change in the acceleration value synchronize with each other, that the mobile device is inserted in a washing machine.

8. The mobile device according to claim 1, wherein the at least one controller is further configured to stop the notification for the user when the at least one controller determines, via matching the pattern of the change of the geomagnetic value with a third geomagnetic pattern, that the mobile device is removed from a washing machine.

9. The mobile device according to claim 1, wherein the predetermined device is the mobile device or a second device communicable with the mobile device.

10. The mobile device according to claim 9, wherein the second device includes the washing machine.

11. The mobile device according to claim 1, wherein the predetermined geomagnetic pattern is a geomagnetic pattern generated in response to the insertion of the mobile device into the washing machine.

12. The mobile device according to claim 5, wherein the second geomagnetic pattern is a geomagnetic pattern generated during proceeding to an amount-of-clothing detection process by the washing machine.

* * * * *